United States Patent [19]

Nagl et al.

[11] Patent Number: 4,708,643
[45] Date of Patent: Nov. 24, 1987

[54] APPARATUS FOR CHARGING A SHAFT FURNACE FOR BURNING CARBONACEOUS MATERIAL

[75] Inventors: Michael Nagl, St. Marien; Gerhard Fugger, Hörsching; Jaroslav Mraz, Neuhofen; Horst Mailänder, Linz; Ernst Rottenmanner, Linz; Norbert Rauber, Linz; Wolfgang Luger, Amstetten, all of Austria

[73] Assignee: Voest-Alpine Aktiengesellschaft, Linz, Austria

[21] Appl. No.: 845,450

[22] Filed: Mar. 28, 1986

[30] Foreign Application Priority Data

May 10, 1985 [AT] Austria ................................. 1411/85

[51] Int. Cl.$^4$ ............................................... F27D 1/08
[52] U.S. Cl. ..................................... 432/95; 414/162; 414/147; 432/97; 110/227
[58] Field of Search ............... 432/95, 96, 97, 239, 432/242; 414/147, 162

[56] References Cited

U.S. PATENT DOCUMENTS

| 1,093,936 | 4/1914 | Koppers | 414/147 |
|---|---|---|---|
| 1,482,677 | 2/1924 | Dunten | 414/147 |
| 3,592,151 | 7/1971 | Webber | 110/228 |
| 3,822,989 | 7/1974 | Tschinkel | 432/95 |
| 4,331,084 | 5/1982 | Fitch et al. | 110/186 |
| 4,412,770 | 11/1983 | Galow et al. | 414/162 |
| 4,451,925 | 5/1984 | Sandoval | 414/162 |
| 4,507,079 | 3/1985 | Nagl | 432/95 |
| 4,544,374 | 10/1985 | Mallek et al. | 110/227 |

FOREIGN PATENT DOCUMENTS

| 377078 | 6/1984 | Austria . | |
| 570461 | 2/1959 | Canada | 414/147 |

Primary Examiner—Henry C. Yuen
Attorney, Agent, or Firm—Kurt Kelman

[57] ABSTRACT

Apparatus for charging a shaft furnace for burning carbonaceous mineral material in at least two furnace shafts comprises a common feed container, which is connected to each furnace shaft by a separate charging duct. In order to provide a simple structure and to reduce the overall height, the feed container is designed to constitute a lock chamber, which is provided with a shut-off valve for controlling the inlet port of the feed container and with a plurality of shut-off valves for controlling respective outlet ports connected to the charging ducts.

2 Claims, 3 Drawing Figures

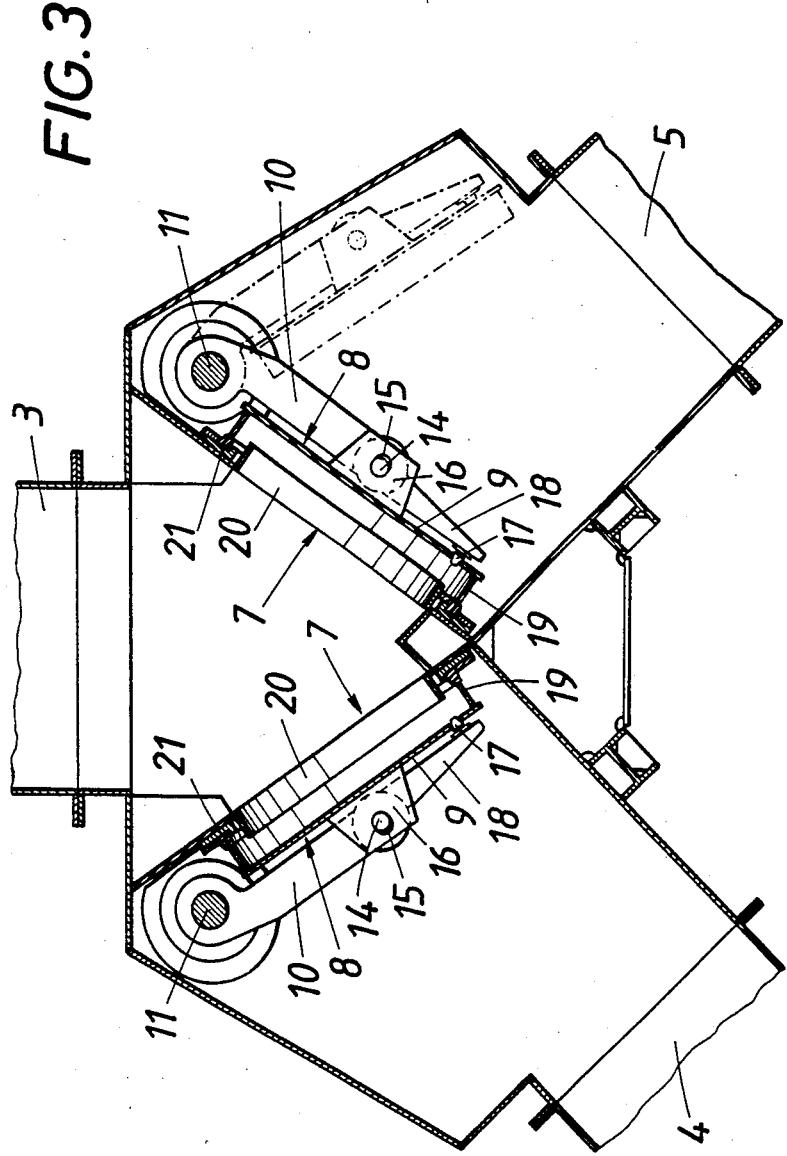

APPARATUS FOR CHARGING A SHAFT FURNACE FOR BURNING CARBONACEOUS MATERIAL

BACKGROUND OF THE INVENTION

1. Field of the Invention

This invention relates to apparatus for charging a shaft furnace for burning carbonaceous mineral material in at least two furnace shafts, which charging apparatus comprises a common feed container, which is connected to each furnace shaft by a separate charging duct.

2. Description of the Prior Art

Austrian Patent Specification No. 377,078 discloses a known apparatus which is of the kind described hereinbefore and which comprises charging pipes leading from the common feed container to the furnace shafts, which are adapted to be charged in alternation with the feed material, which is fed from the feed container to each furnace shaft which is to be charged. A batching device is associated with that container and ensures that each furnace shaft will be charged with a predetermined quantity of feed material so that in comparison to charging apparatus having a separate feed container for each furnace shaft that known apparatus has the advantage that a charging of equal quantities of the feed material to all furnace shafts can be ensured in a simple manner because a variation of the batches by different batching devices associated with respective furnace shafts need not be feared. Besides, the structural expenditure may be relatively low. But said advantages are offset in part by the disadvantage which resides in that pressure lock chambers must be provided between the common feed container and the respective furnace shafts because each furnace shaft must be gastightly sealed. Said lock chambers will add to the required overall height. The pressure lock chambers may comprise a flap valve for each furnace shaft and bell valves succeeding said flap valves. When such charging apparatus is to be used to charge a given furnace shaft, the flap valve associated with that shaft must be opened so that the batch of material that has been delivered to the feed container is transferred through the associated charging pipe to the space which is disposed in the furnace shaft between the flap valve and the bell valve. Thereafter the flap valve is closed and the bell valve can subsequently be opened. Because the feed material rests on the valve bell of the bell valve, the sealing surface of that valve is contacted by the feed material so that undesired loads will be applied.

SUMMARY OF THE INVENTION

It is an object of the invention to avoid said disadvantages and so to improve a charging apparatus which is of the kind described first hereinbefore that a gastight seal of the furnace shaft is ensured by simple means and the overall height of the charging apparatus can be reduced.

This object is accomplished in accordance with the invention in that the feed container is designed to constitute a lock chamber, which is provided with a shut-off valve for controlling the inlet port of the feed container and with a plurality of shut-off valves for controlling respective outlet ports connected to the charging ducts.

Because the feed container itself constitutes a lock chamber, it is not necessary to provide a lock chamber which succeeds the feed container so that the overall height of the charging apparatus may be reduced by the height of conventional lock chambers. The use of the feed container as a lock chamber does not only reduce the overall height but will also simplify the structure because it is not necessary to provide a separate lock chamber for each furnace shaft. When it is desired to charge a given furnace shaft with a predetermined batch of feed material which has been fed to the feed container, it will be sufficient to open only the valve for controlling the outlet port connected to the charging duct which leads to the desired furnace shaft so that the feed material can then be charged through that charging duct into that furnace shaft. This mode of operation will permit the use of a simpler control arrangement.

In accordance with a further embodiment of the invention each valve comprises a valve flap, which is disposed on the downstream side of the feed container adjacent to the port that is to be controlled by the valve, and said valve flap is provided with an annular sealing flange, which in the closed position of the valve flap surrounds an annular flange carried by the feed container around the associated port. In that case a contact of the feed material with the sealing surfaces will be prevented by simple means. The sealing surfaces will be disposed on the outside of the annular flange which is carried by the feed container and which protrudes toward the valve flap and prevents a flow of the feed material to the sealing surfaces. For this reason the valves may be expected to have a long useful life.

In order to permit the feed container to be vented in a simple manner when one of the flap valves is to be opened, the means for opening each flap valve may comprise an actuating arm, which is connected to the valve flap and is pivotally movable relative to the valve flap to a limited extent, which is defined by stops, and said actuating arm actuates a vent valve that is incorporated in the valve flap. Because the actuating arms can be moved relative to the valve flaps to an extent that is defined by stops, the lost motion of the actuating arm can be utilized to actuate a vent valve that is incorporated in the valve flap. When the actuating arm is initially in a position corresponding to the closed position of the associated flap valve and is then rotated in a valve-opening sense, the actuating arm will first perform a lost motion to open the valve and only after said lost motion will the actuating arm engage the valve flap and will then open the latter. Because each flap valve cannot be opened until a vent valve has been opened, very small actuating forces will be sufficient to open the flap valve.

This invention relates also to a shaft furnace plant comprising a shaft furnace having at least two furnace shafts and a charging apparatus for charging said furnace shafts.

BRIEF DESCRIPTION OF THE DRAWING

FIG. 3 is an enlarged sectional view showing the valves at the ports connected to the charging ducts.

DETAILED DESCRIPTION OF THE PREFERRED EMBODIMENT

Figure 1:
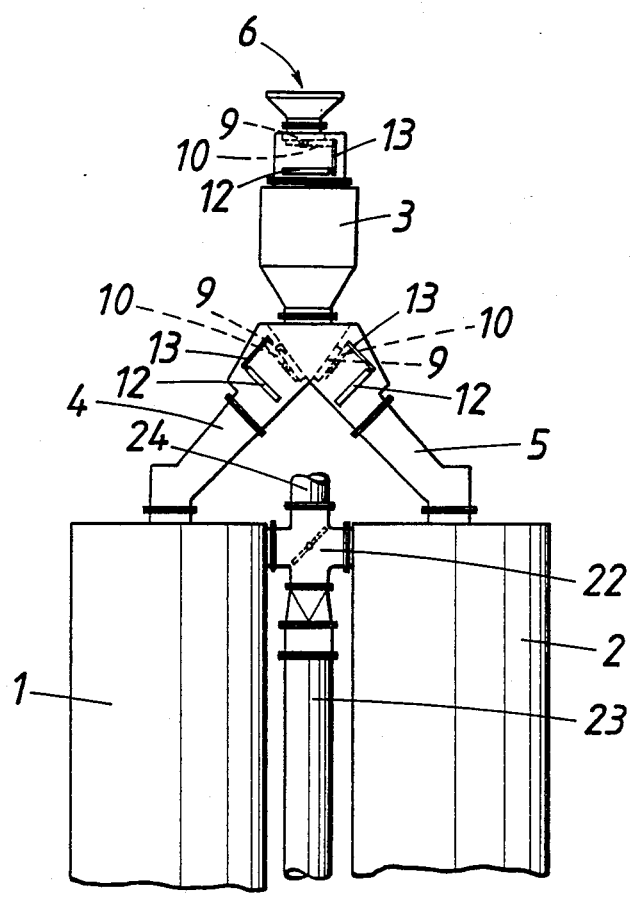
FIG. 1 is a diagrammatic front elevation showing a charging apparatus in accordance with the invention for use with a twin-shaft furnace.

An illustrative embodiment of the invention is shown by way of example on the drawing.

The charging apparatus shown in FIG. 1 is associated with the two furnace shafts 1 and 2 of a twin-shaft furnace and comprises a feed container 3, which is connected by two charging ducts 4 and 5 to the furnace shafts 1 and 2, respectively. For this reason the batch of feed material which has been introduced into the feed container 3 can be delivered to the furnace shafts 1 and 2 in alternation. The container 3 is charged by means of a conveyor, which is not shown for the sake of clearness and which causes the feed material to fall through an inlet port 6 into the feed container.

Figure 2:
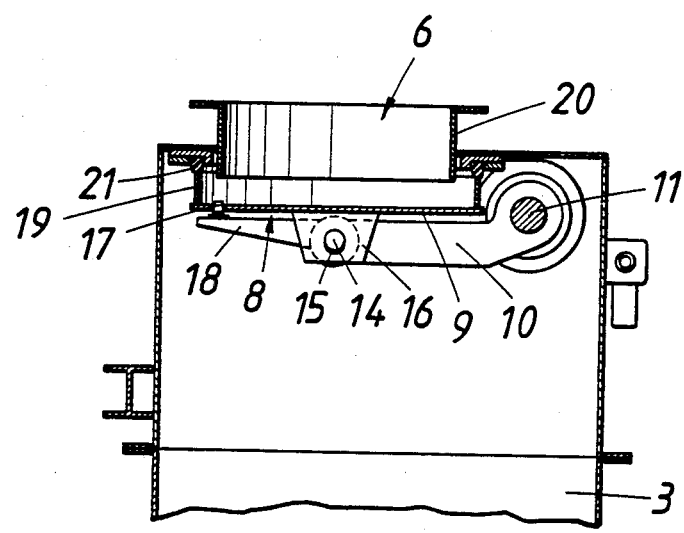
FIG. 2 is an enlarged, simplified sectional view showing the valve provided at the inlet port of the feed container.

A difference from the known charging apparatus resides in that the feed container 3 constitutes a lock chamber, which is provided with a shut-off valve 8 adjacent to the inlet port 6 of the feed container and adjacent to each of the outlet ports 7 connected to the charging lines 4 and 5. In the embodiment shown in FIGS. 2 and 3, each of said valves comprises a valve flap 9, which is connected to an actuating arm 10, which is non-rotatably mounted on an actuating shaft 11, which is adapted to be rotated by a control lever 13, which is actuated by a fluid-operable cylinder 12, as is indicated in FIG. 1. The arrangement is such that the actuating arm 10 carries a pivot pin 14, which extends through a slot 15 formed in a bearing bracket 16, which is mounted on the valve flap 9. When the actuating arm 10 is rotated in a valve-opening sense by the actuating shaft 11, the actuating arm 10 will first perform a lost motion to the extent determined by the slot 15 and the valve flap 9 cannot be opened until that lost motion has been performed. That lost motion is used to open a vent valve 17, which is mounted in the valve flap 9 and is adapted to be opened by an extension 18 provided on the actuating arm 10 on the side of the pivot pin 14 that is opposite to the shaft 11. As is apparent from FIGS. 2 and 3, the valve member of the vent valve 17 is connected to the extension 18 of the actuating arm 10.

When it is desired, e.g., to open the valve 8 associated with the outlet port 7 connected to the charging duct 5, the associated actuating arm 10 is actuated by the associated fluid-operable cylinder 12, the control lever 13 and the actuating shaft 11. By an initial lost motion the actuating arm 10 opens the vent valve 17 so that the feed container 3 is vented to the furnace shaft 2. By a second part of the movement, the valve flap 9 is opened. The open position is indicated in phantom in FIG. 3. When the valve flap has been opened, the feed material can freely flow from the feed container 3 through the charging duct 5 into the furnace shaft 2. It will be understood that the valves adjacent to the inlet port 6 of the feed container 3 and adjacent to the outlet port 7 connected to the charging duct 4 leading to the furnace shaft 1 must then be in a closed position. To close the valve flap 9, the sequence of motions described hereinbefore is performed in the opposite sense. When the valve flap has been closed, the extension 18 closes the vent valve 17 so that a gastight seal of the furnace shaft 2 is reliably reestablished.

A particularly effective seal adjacent to each flap valve will be ensured if the valve flap 9 disposed adjacent to each port 6 or 7 is provided with an inwardly protruding sealing flange 19, which surrounds an annular flange 20 carried by the feed container 3 around the associated inlet port 6 or outlet port 7. Because the annular flange 20 protrudes toward the valve flap 9 and is surrounded by the annular sealing flange 19 of the valve flap 9, it is ensured that the feed material passing through the port will not contact the seals 21 cooperating with the valve flaps 9 so that the useful life of the valve will be improved.

It is diagrammatically indicated in FIG. 1 that a directional control valve 22 may be provided for connecting the furnace shafts 1 and 2 in alternation to a fresh air line 23 and an exhaust gas line 24 in such a manner that exhaust gases from a furnace shaft that is connected to the fresh air line 23, e.g., from the shaft 1, will flow through a transfer passage, not shown, to the other shaft 2, in which they can be used to preheat the charge in a countercurrent operation, and the exhaust gases will subsequently escape from that furnace shaft 2 through the exhaust gas line 24. When the directional control valve 22 has been shifted, feed material and fresh air are supplied to the furnace shaft 2, which has previously been heated in a countercurrent operation by combustion gases from the other furnace shaft 1, and the combustion gases are now caused to flow through the furnace shaft 2 in the same direction as the charge and are subsequently used to preheat the charge in the other furnace shaft 1 in a countercurrent operation. Feed material can be charged to each furnace shaft during the countercurrent or cocurrent operation, as desired.

We claim:

1. In an apparatus for charging a carbonaceous mineral feed material to a shaft furnace having a plurality of furnace shafts, which apparatus comprises a like plurality of charging ducts connected to respective ones of said furnace shafts, and a common feed container holding the feed material and having an inlet port and a plurality of outlet ports, each of which is connected to one of said charging ducts, and each of said inlet and outlet ports having an upstream side and a downstream side, the improvement comprising a respective shut-off valve associated with, and operable to open and close, each one of said inlet and outlet ports so that said common feed container constitutes a lock chamber, each of said shut-off valves comprising a valve flap disposed on the downstream side of the associated port and movable to a closed position to close the associated port, sealing means on the feed container arranged around each of said ports and facing said valve flap in sealing contact with said valve flap in said closed position, an actuating arm operatively connected to each of said valve flaps and pivotally movable in valve-opening and valve-closing senses, stop means permitting a limited pivotal movement of said actuating arm relative to said valve flap so that said actuating arm is operable to perform a lost motion relative to said valve flap, and a vent valve in each of said valve flaps, the vent valve being operatively connected to said actuating arm and arranged to be opened by said actuating arm during said lost motion thereof in said valve-opening sense.

2. The improvement set forth in claim 1, wherein said actuating arm is arranged to close said vent valve during said lost motion in said valve-closing sense.

* * * * *